United States Patent
Huang

(10) Patent No.: US 9,479,926 B2
(45) Date of Patent: Oct. 25, 2016

(54) METHOD AND SYSTEM FOR OBTAINING IMEI OF MOBILE STATION AND BASE STATION CONTROLLER

(71) Applicant: HUAWEI TECHNOLOGIES CO., LTD., Shenzhen (CN)

(72) Inventor: Xiaoming Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 130 days.

(21) Appl. No.: 14/324,315

(22) Filed: Jul. 7, 2014

(65) Prior Publication Data

US 2014/0321387 A1   Oct. 30, 2014

Related U.S. Application Data

(63) Continuation of application No. PCT/CN2012/086913, filed on Dec. 19, 2012.

(30) Foreign Application Priority Data

Jan. 5, 2012 (CN) .......................... 2012 1 0002040

(51) Int. Cl.
*H04W 8/26* (2009.01)
*H04W 8/06* (2009.01)
*H04W 60/00* (2009.01)
*H04W 8/24* (2009.01)

(52) U.S. Cl.
CPC ................ *H04W 8/26* (2013.01); *H04W 8/06* (2013.01); *H04W 8/24* (2013.01); *H04W 60/00* (2013.01)

(58) Field of Classification Search
None
See application file for complete search history.

(56) References Cited

U.S. PATENT DOCUMENTS 6,278,874 B1   8/2001  Verdonk
2005/0220071 A1* 10/2005  Sivalingham ......... H04L 1/0083
370/349

(Continued)

FOREIGN PATENT DOCUMENTS

CN   101022641   8/2007
CN   101170821   4/2008

(Continued)

OTHER PUBLICATIONS

International Search Report mailed Mar. 21, 2013 in corresponding International Patent Application No. PCT/CN2012/086913.

(Continued)

*Primary Examiner* — Min Jung
(74) *Attorney, Agent, or Firm* — Staas & Halsey LLP

(57) ABSTRACT

Embodiments of the present invention relate to a method and a system for obtaining an international mobile equipment identity of a mobile station and a base station controller. The method in this embodiment of the present invention includes: sending, by a base station controller, a request message to a core network device; receiving an accept message of the request message sent by the core network device; sending an identify request message, where a frame sequence number of the identify request message is the same as a frame sequence number of the accept message; receiving an identify response message sent by the mobile station; and re-sending the request message to the core network device in the manner of an unnumbered information frame, where a frame sequence number of the re-sent request message is the same as a frame sequence number of the identify response message.

4 Claims, 2 Drawing Sheets

(56) References Cited

U.S. PATENT DOCUMENTS

| | | | |
|---|---|---|---|
| 2007/0019643 A1* | 1/2007 | Shaheen | H04W 60/00 370/389 |
| 2008/0101282 A1 | 5/2008 | Ogura | |
| 2009/0219896 A1 | 9/2009 | Hakuli et al. | |
| 2011/0188446 A1* | 8/2011 | Bienas | H04W 74/00 370/328 |
| 2011/0208842 A1* | 8/2011 | Mildh | H04B 7/155 709/220 |
| 2012/0122501 A1* | 5/2012 | Lai | H04L 41/0846 455/500 |
| 2013/0072222 A1* | 3/2013 | Weill | H04W 64/00 455/456.1 |
| 2013/0250891 A1* | 9/2013 | Zhang | H04W 74/002 370/329 |
| 2013/0250894 A1* | 9/2013 | Zhang | H04W 48/18 370/329 |

FOREIGN PATENT DOCUMENTS

| | | |
|---|---|---|
| CN | 101312592 | 11/2008 |
| CN | 10191171 | 12/2010 |
| CN | 101945379 | 1/2011 |
| CN | 101945503 | 1/2011 |
| CN | 101959184 | 1/2011 |
| CN | 102438231 | 5/2012 |
| EP | 2 160 049 | 3/2010 |
| EP | 2 615 885 | 7/2013 |
| WO | 2007/136339 A2 | 11/2007 |
| WO | 2008/037804 A1 | 4/2008 |
| WO | 2009/056648 A1 | 5/2009 |

OTHER PUBLICATIONS

Russian Office Action issued Sep. 17, 2015 in Russian Patent Application No. 2014131101.

Extended European Search Report issued Nov. 14, 2014 in corresponding European Patent Application No. 12864564.4.

"Digital cellular telecommunications system (Phase 2+); Universal Mobile Telecommunications System (UMTS); LTE; Mobile radio interface Layer 3 specification; Core network protocols; Stage 3 (3GPP TS 24.008 version 10.4.0 Release 10)", Technical Specification, ETSI TS 124 008 v10.4.0, Nov. 2011, pp. 1-643.

International Search Report issued on Mar. 21, 2013 in corresponding International Patent Application No. PCT/CN2012/086913.

Chinese Office Action issued on Aug. 23, 2013 in corresponding Chinese Patent Application No. 201210002040.0.

Chinese Search Report issued on Aug. 14, 2013 in corresponding Chinese Patent Application No. 201210002040.0.

3GPP: 3rd Generation partnership Project: Technical Specification Group Core Network and Terminals; Mobile radie interface layer 3 specification; Core network protocols; Stage 3 (Release 11), 3GPP TS 24.008 V11.1.2, Jan. 2012.

* cited by examiner

METHOD AND SYSTEM FOR OBTAINING IMEI OF MOBILE STATION AND BASE STATION CONTROLLER

CROSS-REFERENCE TO RELATED APPLICATIONS

This application is a continuation of International Application No. PCT/CN2012/086913, filed on Dec. 19, 2012, which claims priority to Chinese Patent Application No. 201210002040.0, filed on Jan. 5, 2012, all of which are hereby incorporated by reference in their entireties.

TECHNICAL FIELD

Embodiments of present invention relate to the field of communications, and in particular, to a method and a system for obtaining an international mobile equipment identity (IMEI) of a mobile station and a base station controller.

BACKGROUND

An IMEI is an "electronic serial number" that consists of 15 digits, is in one-to-one correspondence with each mobile station (MS), and is unique in the world. Each mobile station is given a globally unique IMEI after being assembled. During a process from manufacturing to delivery for service, a corresponding IMEI of each mobile station is recorded by a manufacturer that performs the manufacturing. In a communications system, only a base station controller (BSC) can deliver an identify request (Identify Request) message to the mobile station to require the IMEI.

Both the mobile station and a serving GPRS support node (SGSN) include an unnumbered information (UI) frame transmission state variable V(U) used for recording a sequence number of a next UI frame to be sent, and a range of the sequence number is 0-511. Each time a UI frame is sent, the V(U) is added by 1. Each UI frame carries a frame sequence number N(U), and a value of the N(U) equals a value of the V(U) when the UI frame is sent.

However, when the base station controller actively delivers the identify request message to query the IMEI of the mobile station, N(U) inconsistency between the mobile station and the serving GPRS support node may be caused. Therefore, a compatibility problem is generated between the mobile station and the serving GPRS support node, and the mobile station may even be offline.

SUMMARY

Embodiments of the present invention provide a method and a system for obtaining an international mobile equipment identity of a mobile station and a base station controller, which can avoid a problem of N(U) inconsistency between a mobile station and a serving GPRS support node that is caused by a base station controller actively queries the IMEI of the mobile station.

The method for obtaining an international mobile equipment identity of a mobile station provided by the embodiments of the present invention includes: sending, by a base station controller, a request message to a core network device in a manner of an unnumbered information frame; receiving, by the base station controller, an accept message of the request message sent by the core network device; sending, by the base station controller, an identify request message to the mobile station, where a frame sequence number of the identify request message is the same as a frame sequence number of the accept message; receiving, by the base station controller, an identify response message sent by the mobile station; and re-sending, by the base station controller, the request message to the core network device in the manner of an unnumbered information frame, where a frame sequence number of the re-sent request message is the same as a frame sequence number of the identify response message.

The base station controller provided by an embodiment of the present invention includes: a sending module, configured to send a request message and re-send the request message to a core network device in a manner of an unnumbered information frame, and further configured to send an identify request message to a mobile station; and a receiving module, configured to receive an accept message of the request message, and further configured to receive an identify response message sent by the mobile station, where a frame sequence number of the identify request message is the same as a frame sequence number of the accept message, and a frame sequence number of the re-sent request message is the same as a frame sequence number of the identify response message.

The system for obtaining an international mobile equipment identity of a mobile station provided by an embodiment of the present invention includes: a core network device, configured to receive a request message sent and the request message re-sent by a base station controller in a manner of an unnumbered information frame, and further configured to send an accept message of the request message to the base station controller; and the base station controller, configured to send an identify request message to the mobile station, and further configured to receive an identify response message sent by the mobile station, where a frame sequence number of the identify request message is the same as a frame sequence number of the request message, and a frame sequence number of the re-sent request message is the same as a frame sequence number of the identify response message.

In the method of this embodiment of the present invention, the base station controller sends the identify request message to the mobile station after receiving the accept message sent by the core network device, where the frame sequence number of the identify request message is the same as the frame sequence number of the accept message; and the base station controller re-sends the request message to the core network device after receiving the identify response message sent by the mobile station, where the frame sequence number of the re-sent request message is the same as the frame sequence number of the identify response message. The method of this embodiment can avoid the problem of N(U) inconsistency between the mobile station and the core network device that is caused by the base station controller actively queries the IMEI of the mobile station, thereby solving a compatibility problem generated between the mobile station and the core network device.

DESCRIPTION OF EMBODIMENTS

Figure 1:
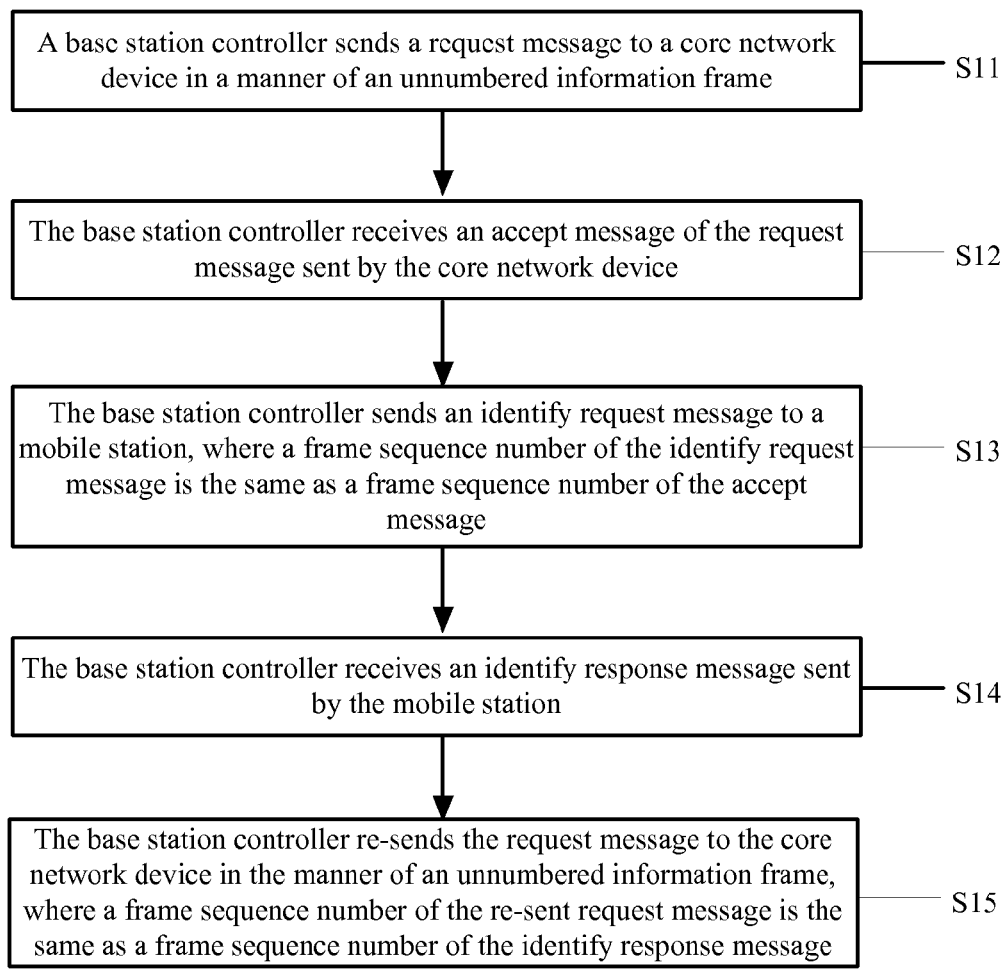
FIG. 1 is a flowchart of a first embodiment of a method according to the present invention.

FIG. 1 is a flowchart of a first embodiment of a method for obtaining an international mobile equipment identity of a mobile station according to the present invention. The method of this embodiment includes the following steps:

S11: A base station controller sends a request message to a core network device in a manner of an unnumbered information frame. The request message may be an attach request (Attach Request) message, the request message may also be a routing area update request (Routing Area Update Request) message, and the core network device may be a serving GPRS support node. Specifically, when a mobile station starts up and registers with a cell, the base station controller sends the attach request message to the core network device; and when the mobile station performs routing area update, the base station controller sends the routing area update request message to the core network device.

S12: The base station controller receives an accept message of the request message sent by the core network device. Specifically, when the base station controller sends the attach request message, the base station controller receives an attach accept (Attach Accept) message; and when the base station controller sends the routing area update request message, the base station controller receives a routing area update accept (Routing Area Update Accept) message.

S13: The base station controller sends an identify request message to the mobile station, where a frame sequence number of the identify request message is the same as a frame sequence number of the accept message. Specifically, when the base station controller sends the attach request message, the frame sequence number of the identify request message is the same as a frame sequence number of the attach accept message; and when the base station controller sends the routing area update request message, the frame sequence number of the identify request message is the same as a frame sequence number of the routing area update accept message.

S14: The base station controller receives an identify response (Identify Response) message sent by the mobile station.

S15: The base station controller re-sends the request message to the core network device in the manner of an unnumbered information frame, where a frame sequence number of the re-sent request message is the same as a frame sequence number of the identify response message. Specifically, when the base station controller sends the attach request message, the base station controller re-sends the attach request message to the core network device, where a frame sequence number of the re-sent attach request message is the same as the frame sequence number of the identify response message; and when the base station controller sends the routing area update request message, the base station controller re-sends the routing area update request message to the core network device, where a frame sequence number of the re-sent routing area update request message is the same as the frame sequence number of the identify response message.

In the method of this embodiment, the base station controller sends the identify request message to the mobile station after receiving the accept message sent by the core network device, where the frame sequence number of the identify request message is the same as the frame sequence number of the accept message; and the base station controller re-sends the request message to the core network device after receiving the identify response message sent by the mobile station, where the frame sequence number of the re-sent request message is the same as the frame sequence number of the identify response message. The method of this embodiment can avoid the problem of N(U) inconsistency between the mobile station and the core network device that is caused when the base station controller actively queries the IMEI of the mobile station, thereby solving a compatibility problem generated between the mobile station and the core network device.

Figure 2:
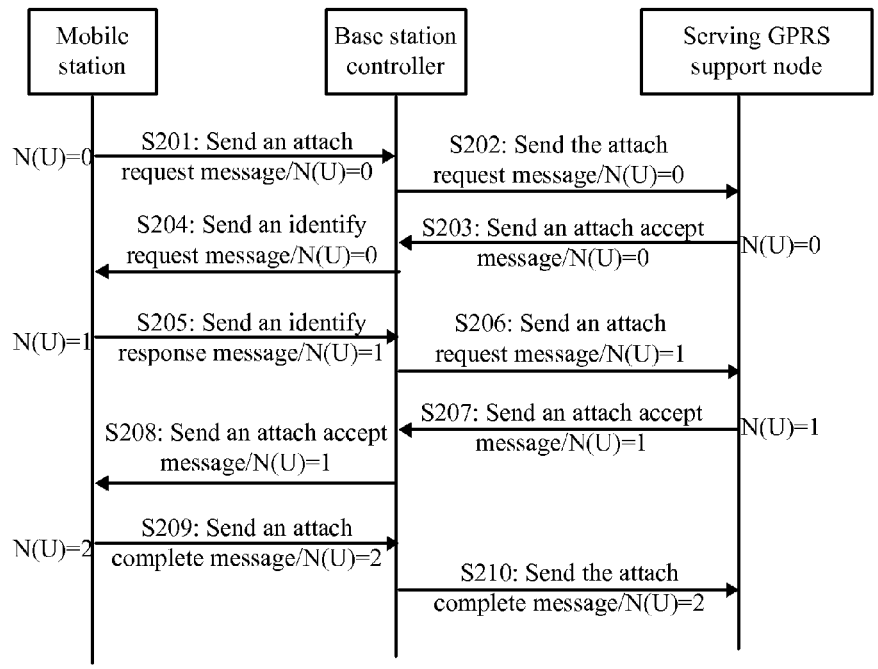
FIG. 2 is a flowchart of a second embodiment of a method according to the present invention.

The method of the foregoing embodiment is further described hereinafter by using an example that the request message sent by the base station controller to the core network device is an attach request message, and that the core network device is a serving GPRS support node. FIG. 2 is a flowchart of a second embodiment of a method according to the present invention, and the method of this embodiment includes the following steps:

S201: A mobile station sends an attach request message to a base station controller, where a frame sequence number N(U) of the attach request message equals 0.

S202: The base station controller sends the attach request message to a serving GPRS support node after receiving the attach request message sent by the mobile station, where a frame sequence number N(U) of the attach request message equals 0.

S203: The serving GPRS support node receives the attach request message sent by the base station controller, and sends an attach accept message to the base station controller, where a frame sequence number N(U) of the attach accept message equals 0.

S204: The base station controller sends an identify request message to the mobile station after receiving the attach accept message, to obtain an IMEI of the mobile station. A frame sequence number of the identify request message is the same as the frame sequence number of the attach accept message. That is, the frame sequence number N(U) of the identify request message equals 0.

S205: The mobile station receives the identify request message sent by the base station controller, and sends an identify response message to the base station controller, where a frame sequence number N(U) of the identify response message equals 1.

S206: The base station controller re-sends the attach request message to the serving GPRS support node after receiving the identify response message, where a frame sequence number of the re-sent attach request message is the same as the frame sequence number of the identify response message, that is, the frame sequence number N(U) of the re-sent attach request message equals 1.

S207: The serving GPRS support node receives the attach request message re-sent by the base station controller, and re-sends the attach accept message to the base station controller, where a frame sequence number N(U) of the re-sent attach accept message equals 1.

S208: The base station controller sends the attach accept message to the mobile station after receiving the attach accept message re-sent by the serving GPRS support node, where a frame sequence number N(U) of the attach accept message equals 1.

S209: The mobile station sends an attach complete (Attach Complete) message to the base station controller after receiving the attach accept message, where a frame sequence number N(U) of the attach complete message equals 2.

S210: The base station controller sends the attach complete message to the serving GPRS support node after receiving the attach complete message, where a frame sequence number N(U) of the attach complete message equals 2.

Figure 3:
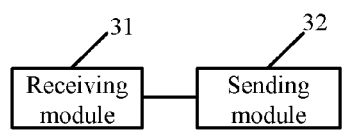
FIG. 3 is a schematic diagram of an embodiment of a base station controller according to the present invention.

FIG. 3 is a schematic diagram of an embodiment of a base station controller according to the present invention. The base station controller includes a sending module 31 and a receiving module 32. The sending module 31 is configured to send a request message and re-send the request message to a core network device in a manner of an unnumbered information frame, and is further configured to send an identify request message to a mobile station. Specifically, the request message may be an attach request message or a routing area update request message, and the core network device may be a serving GPRS support node.

The receiving module 32 is configured to receive an accept message of the request message, and is further configured to receive an identify response message sent by the mobile station. A frame sequence number of the identify request message is the same as a frame sequence number of the accept message, and a frame sequence number of the re-sent request message is the same as a frame sequence number of the identify response message. Specifically, when the request message is the attach request message, the accept message is an attach accept message; and when the request message is the routing area update request message, the accept message is a routing area update accept message.

In the base station controller of this embodiment, after the accept message sent by the core network device is received, the identify request message is sent to the mobile station, where the frame sequence number of the identify request message is the same as the frame sequence number of the accept message; and the base station controller re-sends the request message to the core network device after receiving the identify response message sent by the mobile station, where the frame sequence number of the re-sent request message is the same as the frame sequence number of the identify response message. The base station controller of this embodiment can avoid the problem of N(U) inconsistency between the mobile station and the core network device that is caused when the base station controller actively queries the IMEI of the mobile station, thereby solving a compatibility problem generated between the mobile station and the core network device.

Figure 4:
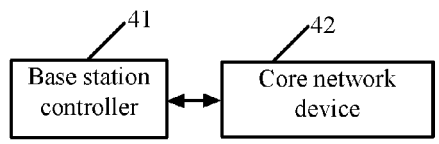
FIG. 4 is a schematic diagram of an embodiment of a system according to the present invention.

FIG. 4 is a schematic diagram of an embodiment of a system for obtaining an international mobile equipment identity of a mobile station according to the present invention. The system of this embodiment includes a base station controller 41 and a core network device 42. The core network device 42 is configured to receive a request message sent and the request message re-sent by the base station controller 41 in a manner of an unnumbered information frame, and is further configured to send an accept message of the request message to the base station controller 41. Specifically, the request message may be an attach request message or a routing area update request message, and the core network device may be a serving GPRS support node. When the request message is the attach request message, the accept message is an attach accept message; and when the request message is the routing area update request message, the accept message is a routing area update accept message.

The base station controller 41 is configured to send an identify request message to the mobile station, and is further configured to receive an identify response message sent by the mobile station, where a frame sequence number of the identify request message is the same as a frame sequence number of the accept message, and a frame sequence number of the re-sent request message is the same as a frame sequence number of the identify response message.

In the system of this embodiment, the base station controller sends the identify request message to the mobile station after receiving the accept message sent by the core network device, where the frame sequence number of the identify request message is the same as the frame sequence number of the accept message; and the base station controller re-sends the request message to the core network device after receiving the identify response message sent by the mobile station, where the frame sequence number of the re-sent request message is the same as the frame sequence number of the identify response message. The system of this embodiment can avoid the problem of N(U) inconsistency between the mobile station and the core network device that is caused when the base station controller actively queries the IMEI of the mobile station, thereby solving a compatibility problem generated between the mobile station and the core network device.

The foregoing description merely discloses some embodiments of the present invention and definitely cannot be used to limit the scope of the claims of the present invention. Therefore, equivalent changes made according to the claims of the present invention still fall within the scope of the present invention.

What is claimed is:

1. A method for obtaining an international mobile equipment identity (IMEI) of a mobile station, comprising:
   sending, by a base station controller, a request message to a core network device, wherein the request message is an attach request message or the request message is a routing area update request message;
   receiving, by the base station controller, an accept message of the request message sent by the core network device, wherein the accept message is an attach accept message or the accept message is a routing area update accept message;
   sending, by the base station controller, an identify request message to the mobile station for obtaining the IMEI, wherein a frame sequence number of the identify request message is the same as a frame sequence number of the accept message;
   receiving, by the base station controller, an identify response message sent by the mobile station; and
   re-sending, by the base station controller, the request message to the core network device, wherein a frame sequence number of the re-sent request message is the same as a frame sequence number of the identify response message.

2. A base station controller, comprising:
   a sender configured to send a request message and re-send the request message to a core network device, and further configured to send an identify request message to a mobile station for obtaining an international mobile equipment identity MED, wherein the request message is an attach request message or the request message is a routing area update request message; and
   a receiver configured to receive an accept message of the request message, and further configured to receive an identify response message sent by the mobile station, wherein a frame sequence number of the identify request message is the same as a frame sequence number of the accept message, and a frame sequence number of the re-sent request message is the same as a frame sequence number of the identify response message, wherein the accept message is an attach accept message or the accept message is a routing area update accept message.

3. A system for obtaining an international mobile equipment identity (IMEI) of a mobile station, comprising:
   a core network device configured to receive a request message sent and the request message re-sent by a base station controller, and further configured to send an accept message of the request message to the base station controller, wherein the request message is an attach request message or the request message is a routing area update request message, the accept message is an attach accept message or the accept message is a routing area update accept message; and
   the base station controller configured to send an identify request message to the mobile station for obtaining the IMEI, and further configured to receive an identify response message sent by the mobile station, wherein a frame sequence number of the identify request message is the same as a frame sequence number of the accept message, and a frame sequence number of the re-sent request message is the same as a frame sequence number of the identify response message.

4. The system according to claim 3, wherein the core network device is a serving GPRS support node.

* * * * *

UNITED STATES PATENT AND TRADEMARK OFFICE
CERTIFICATE OF CORRECTION

PATENT NO.         : 9,479,926 B2                                        Page 1 of 1
APPLICATION NO.    : 14/324315
DATED              : October 25, 2016
INVENTOR(S)        : Xiaoming Huang It is certified that error appears in the above-identified patent and that said Letters Patent is hereby corrected as shown below:

In the Claims

Column 6, Line 57, Claim 2:
Delete "MED" and insert --IMEI--, therefor.

Signed and Sealed this
Second Day of May, 2017

Michelle K. Lee
*Director of the United States Patent and Trademark Office*